Jan. 26, 1932.     C. O. BENGTSSON     1,842,741
NONREMOVABLE DISPLAY HOLDER
Filed Sept. 8, 1931
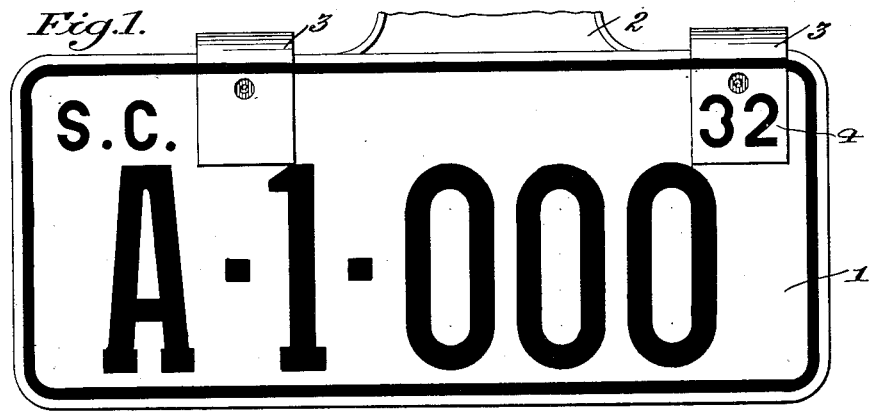
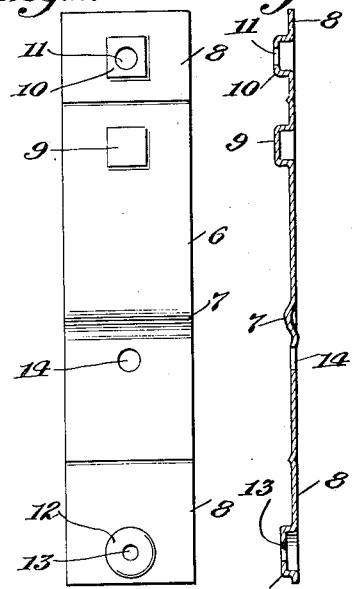
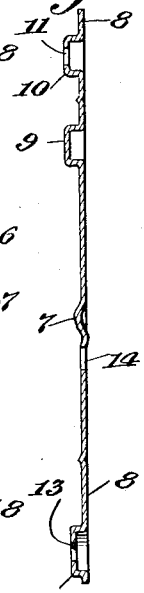
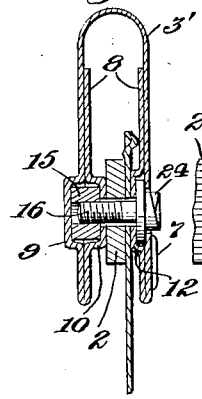
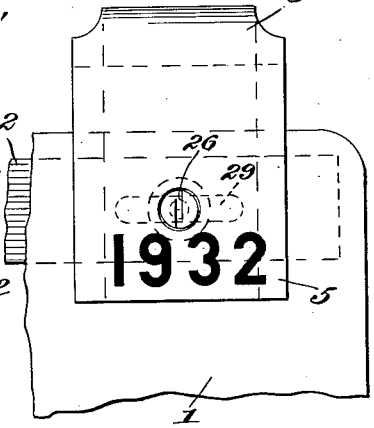
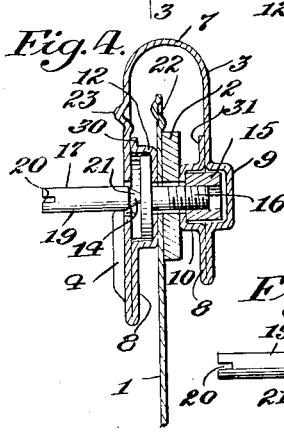
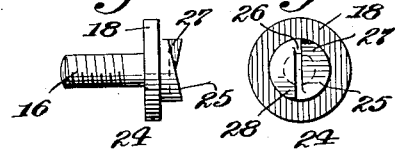
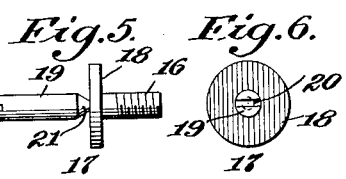
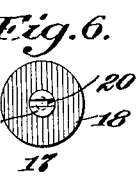
*Inventor:*
Carl O. Bengtsson,
by
*Atty.*

Patented Jan. 26, 1932

1,842,741

UNITED STATES PATENT OFFICE

CARL O. BENGTSSON, OF HUNTINGDON, PENNSYLVANIA

NONREMOVABLE DISPLAY HOLDER

Application filed September 8, 1931. Serial No. 561,776.

This invention relates to a device for holding a display or the like and in which the display, consisting of a plate or the like, cannot be removed after it has been once placed in position, without destruction of the said plate or display. The invention is particularly adapted for use in connection with automobile license tags, wherein it is desirable to prevent unauthorized substitution of one set of tags for another.

More particularly, the invention comprises a novel form of clip, which in conjunction with a unique form of locking bolt, acts to bring about the desired action. Essentially, this clip is of substantially U-shape, the ends of the legs of the said clip being bent inwardly and back against the corresponding leg, and being preferably secured in place in any desired manner, as by spot welding. This U-shaped clip is provided in the cooperating portions of one leg with complementary indented portions coacting to form a recess sufficiently large to receive a lock nut. At least one of the cooperating portions of the other leg of the clip is also provided with a recess, the purpose of which will be more fully explained hereinafter. The clip thus formed, provided with a bolt having an enlarged skirt adjacent its head mounted therein with its skirt portion resting in the said last-mentioned recess, is fitted about the license tag and the bracket therefor, it being possible to bend the clip into a true U-shape only after the threaded portion of the bolt is passed through the apertures provided therefor in the said tag and bracket.

It is obvious from the foregoing that means must be provided on the bolt whereby the latter, in combination with the clip as above described, cannot be withdrawn from the lock nut into which it is threaded without destruction of the tag. Although this object can be accomplished in any desired manner, in the preferred form of my invention, I weaken the bolt on the face of the skirt opposed to the threaded portion by means of a suitable scoring such as by conically turning down a portion of the bolt on a lathe or the like. Then, when the bolt is threaded into the lock nut, the bolt has sufficient rigidity to thread firmly into place. Once it has been properly seated, however, an attempt at further rotation of the bolt in the same direction will result in sheering thereof, so that the outer surface of the skirt, rendered inaccessible by its mounting within said last-mentioned recess, will represent the outermost portion of the bolt. Obviously, it is impossible to remove the bolt without destruction of the tag or other display.

In a modified form of my invention the bolt has a skirt somewhat similar to that described with reference to the first-mentioned bolt. However, instead of having a portion of reduced section, as does the first-mentioned bolt, it relies for uni-directional turning upon the use of a slotted head having complementary tapered sides defining the walls of the said slot, whereby the bolt can be threaded in a right-hand direction by means of the ordinary screwdriver (that is, it can be seated), but when an attempt is made to thread the bolt in a left-hand direction, the screwdriver slips idly over the tapering walls of the slot.

It follows, therefore, that one object of my invention is to produce a new form of plate or display holder.

Another object is to produce a new form of plate or display holder wherein, after the plate or display is once mounted in the holder, it cannot be removed without destruction thereof.

Another object is to produce a new form of clip for holding a plate or display, from which the plate cannot be removed without destruction thereof.

Another object is to produce a substantially U-shaped clip for holding plates or displays, and having a lock nut secreted therein from which the cooperating bolt cannot be removed without destruction of the said plates or displays.

Still another object is to produce a new form of clip for holding plates or displays, having a lock nut secreted therein, and a novel form of bolt cooperating with said lock in such manner that the plate or display cannot be removed from the clip without destruction of said plate or display.

Yet another object is to produce a new form of clip for holding plates or displays, in which a lock nut is secreted, and having a bolt cooperating with said lock nut and so constructed that the bolt cannot be removed from the lock nut without destruction of the plate or display, which has been secured to the clip by means of said bolt.

Numerous modifications and advantages will more fully appear hereinafter.

In order that the invention may be more readily understood, reference should be had to the accompanying drawings, wherein Fig. 1 illustrates in front elevation a license tag, for which the invention is particularly adapted, secured to a bracket by means of clips constructed according to my invention;

Fig. 2 represents in elevation a development of a clip according to my invention;

Fig. 3 is a transverse section taken on the line 3—3 of Fig. 2;

Fig. 4 is a transverse, vertical section on a large scale through one form of my invention, showing the clip firmly securing a license tag to a suitable retaining bracket;

Figs. 5 and 6 are respectively a side view and a top plan view of the particular form of bolt employed in connection with the clip of Fig. 4;

Fig. 7 is a view similar to Fig. 4, but shows the clip in combination with a different form of bolt;

Fig. 8 is a front elevation of the clip according to Fig. 7; while

Figs. 9 and 10 are respectively a side elevation and a plan view of the bolt employed in combination with the clip of Figs. 7 and 8.

Referring more particularly to Fig. 1, the ordinary license tag is shown at 1, and is secured to a retaining bracket 2 by means of the novel clips 3—3, which, as pointed out above, are of such construction that the tag cannot be removed from the bracket without the destruction of such tag, thus preventing unwarranted removal and exchange of license tags. As one refinement of my invention, it is contemplated that suitable numerals indicative of the year, State, or the like such as shown at 4 be embossed or otherwise placed on the clips 3. As shown at 5 on Figs. 7 and 8, this embossed number may comprise all four numerals indicating the year.

In a preferred form of my invention, the novel form of clip comprises a sheet of strong, yet pliable metal, such as sheet steel, which metal is stamped or otherwise cut out to produce a sheet 6, shown in development in Figs. 2 and 3. This clip is bent at a point 7 slightly offset with respect to its transverse center, to form a substantially U-shaped clip of the type shown at 3 and 3' in Figs. 1, 4, 7, and 8. Each of the leg portions of the clip, formed in the manner described above, has its outer extremity 8 folded inwardly back on the adjacent leg, and ultimately is preferably secured thereto in any suitable manner as by spot welding or the like. In the preferred form of my invention at least one leg is provided with an indented portion 9 in the main leg portion and a complementary indented or recessed portion 10 in the corresponding folded-back extremity 8. These indented portions, when the extremity 8 is folded-back on the main leg portion, define a recess adapted to receive and retain a lock nut, the indented portion 10 in the present instance being provided with an aperture 11 through which the bolt coacting with the lock nut can pass. The other leg of the clip is shown as having but one indented portion, this indented portion being provided with the extremity 8 and being adapted to receive and conceal an outwardly extending skirt or the like on the bolt extending therethrough, this indented portion 12 being provided with an aperture 13 through which the bolt can extend, and the corresponding leg having a larger aperture 14 for receiving the bolt head.

In the form of the invention shown in Fig. 4 and which I find at present to be most practicable, the lock nut above referred to is shown at 15, and receives the threaded portion 16 of the bolt indicated generally by the reference numeral 17. The bolt 17 has a skirt portion 18 received in the corresponding recess 12 of one of the leg portions 8, and of course is placed therein before the extremity 8 is completely folded back on the leg portion and spot welded thereto. The remainder of the bolt comprises an outwardly protruding extremity 19 having a transverse slot 20 in the end thereof adapted for the reception of a screwdriver or the like. The extremity 19 is provided adjacent the skirt 18 with a portion 21 of reduced section, whereby, when the bolt is threaded into the nut 15, which has been placed in the complementary recesses 9 and 10 before the extremity 8 has been completely bent back on the corresponding leg portion and spot welded thereto, it will possess sufficient strength at the portion 21 to permit such threading action. However, once the bolt has been properly seated, further attempt at turning the bolt in the same direction will result in sheering the extremity 19 at the point 21, adjacent the face of the skirt 18. As a consequence, since the clip, together with its lock nut and bolt, securely clamps together the tag 1 and bracket 2 which have been inserted between the legs of the clip before the latter has been folded at its point 7 into its U-shape, it will be impossible to remove the tag from the clip without tearing or otherwise destroying such tag. Since the only portion of the bolt which is at all accessible after the extremity 19 has been removed is the smooth, outer surface of the skirt 18, and this only through the comparatively small opening 14, it is obvious that it is impossible to remove the tag without destruction thereof. As a possible refinement of my invention, it is contemplated that undulations 22 be provided at the top of the license tag, for cooperation with the top of the bracket 2 for further ensuring that the tag is clamped in exact position. Though not absolutely necessary, similar undulations 23 are provided near the top of the outer leg of the clip.

The clip 3′ of Figs. 7 and 8 differs but slightly from that of Figs. 2 through 4, be-being provided with the same recessed portions 9 and 10 in the rear leg, and a substantially similar recessed portion 12 in the front leg. The recessed portions 9 and 10 cooperate to receive a bolt 15 in the same manner as described with respect to Fig. 4. Substantially the only differences between the two clips is that the clip 3′ may have all of the numerals of the year embossed thereacross and, which is of much more importance, may be provided with a different form of bolt. This bolt, broadly indicated in Figs. 9 and 10 by the reference numeral 24, has a threaded portion 16 similar to that of the bolt 17, a skirt 18 also corresponding to that of the bolt 17, and a novel form of head 25 to be more fully described. This head 25 has a slot 26 provided therein, adapted for the reception of a screwdriver or the like, and which is so constructed that while the screwdriver can readily turn the bolt in a right handed direction into locking engagement with the lock nut, it cannot act to back off the bolt from said lock nut. The desired action is caused by tapering the metal defining the wall of the slot 26 in such manner that in Figs. 9 and 10, while the lowermost end of the right hand wall of the slot 26 is substantially flush with the trough of said slot, it flares upwardly so that at 27 it has a comparatively considerable height. The left hand wall is flared in similar manner, but in a contrary direction, so that the uppermost edge of the wall lies substantially flush with the trough of the groove 26, while the lowermost portion 28 thereof has a comparatively considerable height. Now, when a screwdriver is inserted in the said slot 26, it will bear against the raised portions 27 and 28 and will act to force the bolt in a right hand direction. However, when an effort is made to turn the screwdriver in a left hand direction it will ride idly up the tapered or cam shaped surfaces of the head 25, and will impart no turning action to the said bolt.

Although not essential, it is of course advantageous to provide the openings in the tag 1 through which pass the securing bolts in the form of elongated slots 29.

The manner of assembly of a clip according to my invention will be obvious from the foregoing. However, in order to ensure a clear understanding of this feature, the sequence of assembly steps are repeated at this time. Taking the developed sheet 6 of Figs. 2 and 3, the extremity 19 of the bolt 17 is passed from the right hand side through the opening 14, whereupon the extremity 8 of the leg portion of the clip is folded back on said leg portion and spot welded or otherwise secured thereto as at 30 (Fig. 4). The lock nut 15 is then placed in one of the recesses 9 and 10, whereupon the extremity 8 is folded back on the corresponding leg portion and spot welded or otherwise secured thereto at the point 31 (Fig. 4). The license tag is placed in juxtaposition with the bracket 2 in such manner that the undulated portion 22 of the tag rests on the upper edge of the front face of the said license tag. The clip 3, still developed as regards its leg portions, is then fitted over the assembled tag and bracket, and is gradually so bent into its U-shaped form that the threaded portion 16 of the bolt 17 passes through the openings therefor in the bracket and license tag, and is received in the lock nut 15. The bolt is then seated in the lock nut 15 and in the case of the device of Fig. 4, is further subjected to rotational stress after seating to sheer the extremity 17. With the device thus assembled, the tag cannot be removed without destruction thereof.

It is of course obvious that once my invention has been disclosed, numerous modifications and adaptions falling within the scope of the invention will readily occur to those skilled in the art. Accordingly, it is intended that my invention be limited only by the scope of the appended claims.

I claim:

1. A plate or display holder, comprising a bracket; a clip cooperating therewith, and comprising two leg portions, each having an extremity folded back thereupon, a recess being defined between complementary indented portions of one of the said legs and its folded back extremity; a lock nut placed in said recess; and a bolt extending through said clip, said plate or display, and said bracket, and threading into the said nut, said bolt having means cooperating with said nut for preventing withdrawal of the bolt without destruction of the plate or display.

2. A license tag holder comprising a bracket; a substantially U-shaped clip cooperating therewith, and comprising two leg portions, each having an extremity folded inwardly back thereupon, one of the said legs having complementary indented portions in the main portion of the said leg and in its extremity, the said indented portions defining a recess; a lock nut mounted in the said recess; at least the extremity of the other of the said legs having an indented portion therein cooperating with the main portion of the leg to define a recess; and a bolt passing through the said clip and having a skirt portion concealed in the said last-mentioned recess, the said bolt also passing through the license tag and bracket and threading into the said nut, said bolt having means cooperating with the nut, for preventing withdrawal of the bolt without destruction of the tag.

3. A license tag holder comprising a bracket; a substantially U-shaped clip cooperating therewith, and comprising two leg portions, each having an extremity folded inwardly back thereupon, one of the said legs having complementary indented portions in the main portion of the said leg and in its extremity, the said indented portions defining a recess; a lock nut mounted in the said recess; at least the extremity of the other of the said legs having an indented portion therein cooperating with the main portion of the leg to define a recess; and a bolt passing through the said clip and having a skirt portion concealed in the said last-mentioned recess, the said bolt also passing through the license tag and bracket and threading into the said nut, said bolt having an extremity thereon extending outwardly from the said skirt, the said extremity being provided with a slot adapted to receive a screwdriver and being provided adjacent the skirt with a portion of weakened section, whereby although the extremity has sufficient strength to transfer rotational stress to the bolt until it is seated, additional turning will result in sheering of the extremity at its point of weakened section.

4. A license tag holder comprising a bracket; a substantially U-shaped clip cooperating therewith, and comprising two leg portions, each having an extremity folded inwardly back thereupon, one of the said legs having complementary indented portions in the main portion of the said leg and in its extremity, the said indented portions defining a recess; a lock nut mounted in the said recess; at least the extremity of the other of the said legs having an indented portion therein cooperating with the main portion of the leg to define a recess; and a bolt passing through the said clip and having a skirt portion concealed in the said last-mentioned recess, the said bolt also passing through the license tag and bracket and threading into the said nut, the said bolt having shoulders whereby the bolt can be turned in one direction by an ordinary screwdriver to seat the bolt in the nut, but rendering the said screwdriver incapable of turning the bolt in the opposite direction.

5. As an element of a plate or display holder, a clip having cooperating leg portions, each leg portion having inwardly turned extremities bent back thereupon, the main portion and the extremity of one leg having complementary indented portions defining a recess; a lock nut received in said recess, means in the other leg for holding a bolt; the said bolt extending through said last-mentioned leg and threading into the said lock nut, the said bolt having means cooperating with said nut for preventing withdrawal of the bolt without destruction of the said plate or display.

6. As an element of a plate or display holder, a substantially U-shaped clip, the leg portions of which have inwardly turned extremities bent back thereupon, and secured thereto, the main portion and the extremity of one leg having complementary indented portions defining a recess; a lock nut mounted in said recess; at least the extremity of the other leg having an indented portion defining together with the main portion, a second recess; a bolt having a skirt portion by means of which it is secured in said last-mentioned leg, and adapted to thread into the said nut, said bolt having means, cooperating with said nut, for preventing withdrawal of the bolt without destruction of the tag.

7. As an element of a plate or display holder, a substantially U-shaped clip, the leg portions of which have inwardly turned extremities bent back thereupon, and secured thereto, the main portion and the extremity of one of said legs having complementary indented portions defining a recess; a lock retained in the said recess; a bolt passing through said other leg, and having a skirt thereon, the said last-mentioned leg retaining said bolt by means of said skirt; an extremity on said bolt extending outwardly from the said skirt, and having a portion of reduced section adjacent said skirt, the said extremity possessing sufficient strength to transfer rotational stresses to the bolt until the latter is seated, but being sheered at the point of reduced section upon attempt to further rotate the bolt in the direction of seating.

8. As an element of a plate or display holder, a substantially U-shaped clip, the leg portions of which have inwardly turned extremities bent back thereupon, and secured thereto, the main portion and the extremity of one of said legs having complementary indented portions defining a recess; a lock nut retained in the said recess; a bolt passing through said other leg, and having a skirt thereon, the said last-mentioned leg retaining said bolt by means of said skirt; the said bolt having shoulders thereon whereby it can be turned in one direction by means of an ordinary screwdriver for seating it in said lock nut, but rendering the screwdriver incapable of turning the bolt in the opposite direction.

In testimony whereof I have signed my name to this specification.

CARL O. BENGTSSON. [L. S.]